United States Patent
Wang et al.

(10) Patent No.: US 8,209,102 B2
(45) Date of Patent: Jun. 26, 2012

(54) ACCELERATOR PEDAL TORQUE REQUEST SYSTEMS AND METHODS

(75) Inventors: Lan Wang, Troy, MI (US); James L. Worthing, Munith, MI (US); Jinchun Peng, Canton, MI (US); Robert D Peavyhouse, Davison, MI (US); Zhong Wang, Bellevue, WA (US)

(73) Assignee: GM Global Technology Operations LLC

( * ) Notice: Subject to any disclaimer, the term of this patent is extended or adjusted under 35 U.S.C. 154(b) by 338 days.

(21) Appl. No.: 12/689,048

(22) Filed: Jan. 18, 2010

(65) Prior Publication Data
US 2011/0178691 A1    Jul. 21, 2011

(51) Int. Cl.
*G06F 17/00*    (2006.01)
*G06F 17/11*    (2006.01)
(52) U.S. Cl. .................................. 701/84; 123/406.23
(58) Field of Classification Search .................. 701/102, 701/110, 84, 54; 123/406.23, 406.46, 406.5, 123/406.51, 492
See application file for complete search history.

(56) References Cited

U.S. PATENT DOCUMENTS
7,171,299 B1 *    1/2007    Stroh ........................... 701/110
2008/0243355 A1 *    10/2008    Whitney et al. ............... 701/102

OTHER PUBLICATIONS
U.S. Appl. No. 12/565,340, filed Sep. 23, 2009, Joseph M. Stempnik.

* cited by examiner

*Primary Examiner* — Mahmoud Gimie

(57) ABSTRACT

An engine control system comprises a pedal torque request module, a filtering module, a selection module, and an arbitration module. The pedal torque request module determines a first pedal torque request at a first time and determines a second pedal torque request at a second time. The first time is before the second time. The filtering module determines a filtered pedal torque request based on the first pedal torque request, the second pedal torque request, and a filter coefficient. The selection module selects one of the second pedal torque request and the filtered pedal torque request. The arbitration module arbitrates between at least one driver torque request and the selected one of the second pedal torque request and the filtered pedal torque request, outputs a raw driver request based on a result of the arbitration, and controls at least one engine actuator based on the raw driver request.

20 Claims, 5 Drawing Sheets

ACCELERATOR PEDAL TORQUE REQUEST SYSTEMS AND METHODS

CROSS-REFERENCE TO RELATED APPLICATIONS

This application is related to U.S. patent application Ser. No. 12/565,340, filed on Sep. 23, 2009. The disclosure of the above application is incorporated herein by reference.

FIELD

The present disclosure relates to internal combustion engines and more particularly to engine torque requests.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Airflow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. Increasing the air and fuel to the cylinders increases the torque output of the engine.

Engine control systems have been developed to control engine torque output to achieve a desired predicted torque. Traditional engine control systems, however, do not control the engine torque output as accurately as desired. Further, traditional engine control systems do not provide as rapid of a response to control signals as is desired or coordinate engine torque control among various devices that affect engine torque output.

SUMMARY

An engine control system comprises a pedal torque request module, a filtering module, a selection module, and an arbitration module. The pedal torque request module determines a first pedal torque request at a first time and determines a second pedal torque request at a second time. The first time is before the second time. The filtering module determines a filtered pedal torque request based on the first pedal torque request, the second pedal torque request, and a filter coefficient. The selection module selects one of the second pedal torque request and the filtered pedal torque request. The arbitration module arbitrates between at least one driver torque request and the selected one of the second pedal torque request and the filtered pedal torque request, outputs a raw driver request based on a result of the arbitration, and controls at least one engine actuator based on the raw driver request.

An engine control method comprises: determining a first pedal torque request at a first time; determining a second pedal torque request at a second time, wherein the first time is before the second time; determining a filtered pedal torque request based on the first pedal torque request, the second pedal torque request, and a filter coefficient; selecting one of the second pedal torque request and the filtered pedal torque request; arbitrating between at least one driver torque request and the selected one of the second pedal torque request and the filtered pedal torque request; outputting a raw driver request based on a result of the arbitration; and controlling at least one engine actuator based on the raw driver request.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
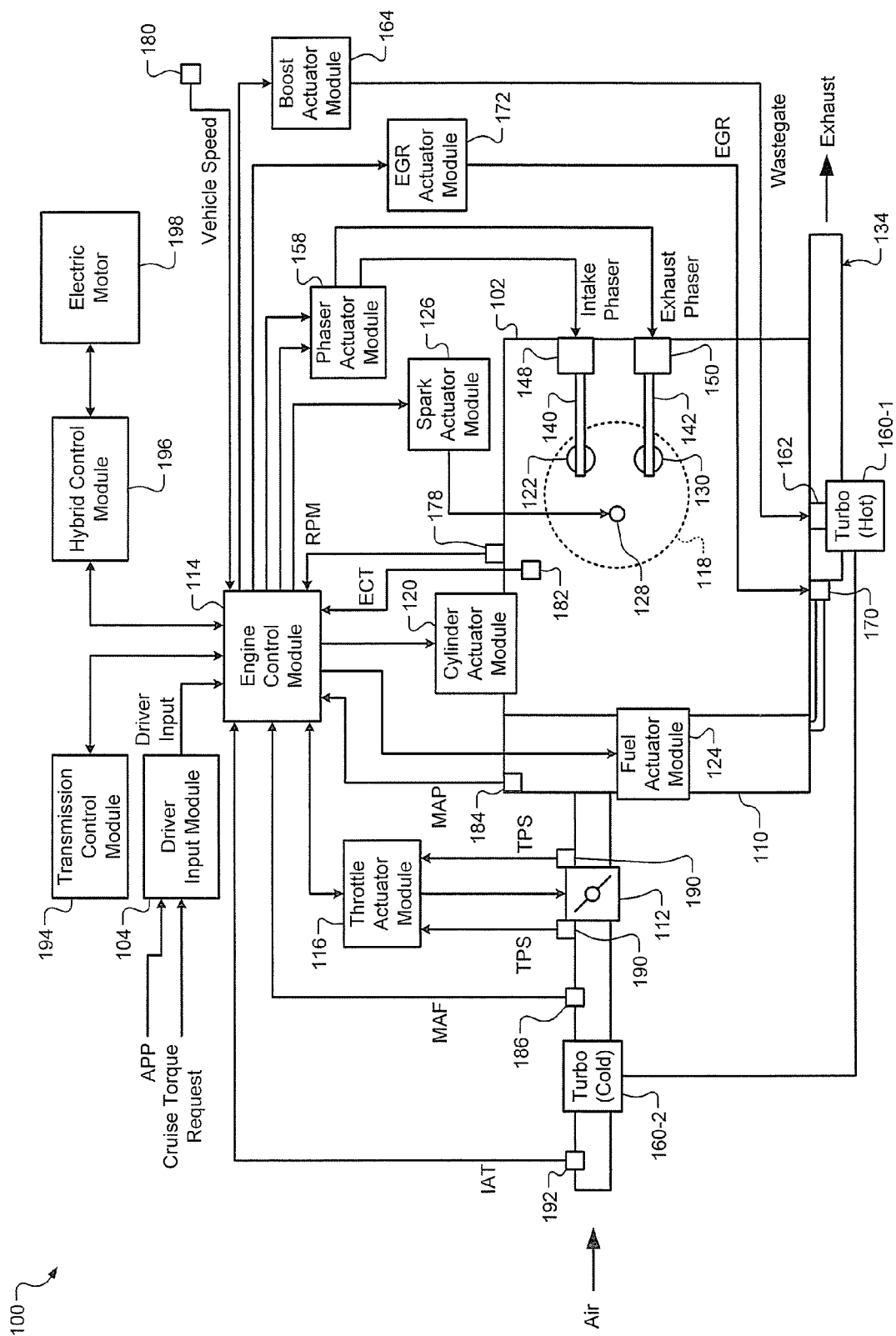
FIG. 1 is a functional block diagram of an exemplary implementation of an engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A controller selectively controls torque output of an engine based on a driver axle torque request. Various computations, calculations, and conversions may be made in order to determine the driver axle torque request. For example, a pedal torque request may be determined based on driver inputs made via an accelerator pedal. The pedal torque request may be arbitrated with other driver requests, such as inputs made via a cruise control system. The torque request resulting from the arbitration may be shaped to provide a smooth driving feel when a tip-in or a tip-out of the accelerator pedal may otherwise cause the driver to experience a "bump" or other vehicle movement. However, the pedal torque request may be left unshaped at times when it is unlikely that the driver will experience such vehicle movement.

The controller of the present disclosure selectively filters the pedal torque request before the pedal torque request is subjected to arbitration with the other driver inputs (e.g., torque requests from a cruise control system). Filtering the pedal torque request before the arbitration, at times when the pedal torque request may otherwise be unshaped, may allow for a decrease in fuel consumption. The filtering may also enable more accurate control of one or more components of exhaust gas output and increase the reliability of one or more diagnostics that may be performed.

Referring now to FIG. 1, a functional block diagram of an exemplary engine system 100 is presented. The engine system 100 includes an engine 102 that combusts an air/fuel mixture to produce drive torque for a vehicle based on driver input(s) from a driver input module 104. The driver inputs may include, for example, one or more accelerator pedal positions (APPs) measured by APP sensors (not shown), one or more brake pedal positions (BPPs) measured by BPP sensors (not shown), and a cruise torque request provided by a cruise control system (not shown). In various implementations, the cruise control system may include an adaptive cruise control system that maintains a predetermined following distance.

Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into one or more cylinders of the engine 102. While the engine 102 may include more than one cylinder, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy in some circumstances.

The engine 102 may operate using a four-stroke engine cycle. The four strokes, described below, may be referred to as the intake stroke, the compression stroke, the combustion stroke, and the exhaust stroke. During each revolution of a crankshaft (not shown), two of the four strokes occur within the cylinder 118. Therefore, two crankshaft revolutions may be necessary for the cylinder 118 to experience all four of the strokes of one engine cycle.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve(s) of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture. During the compression stroke, a piston (not shown) within the cylinder 118 compresses the air/fuel mixture. Based on a signal from the ECM 114, a spark actuator module 126 energizes a spark plug 128 in the cylinder 118, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Combustion of the air/fuel mixture within a cylinder may be referred to as a firing event. The spark actuator module 126 may have the ability to vary the timing of the spark for each firing event. In addition, the spark actuator module 126 may have the ability to vary the spark timing for a given firing event even when a change in the timing signal is received after a firing event of a cylinder immediately before a given firing event.

During the combustion stroke, the combustion of the air/fuel mixture drives the piston away from the TDC position, thereby driving the rotation of the crankshaft. The combustion stroke may be defined as the time between the piston reaching TDC and the time at which the piston reaches a bottommost position, which may be referred to as bottom dead center (BDC).

During the exhaust stroke, the piston begins moving toward the TDC position again and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as electromagnetic actuators.

The time at which the intake valve 122 is opened may be varied with respect to the TDC position by an intake cam phaser 148. The time at which the exhaust valve 130 is opened may be varied with respect to the TDC position by an exhaust cam phaser 150. A phaser actuator module 158 may control the intake cam phaser 148 and the exhaust cam phaser 150 based on signals from the ECM 114. When implemented, variable valve actuation (VVA) technologies (not shown) may also be controlled by the phaser actuator module 158.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, that compresses air leading into the throttle valve 112. In various implementations, a supercharger (not shown), driven by the crankshaft, may compress air from the throttle valve 112 and deliver the compressed air to the intake manifold 110.

A wastegate 162 (e.g., a turbo bypass valve) may allow exhaust to bypass the turbine 160-1, thereby reducing the boost provided by the turbocharger. The boost may include, for example, the difference between pressure within the intake manifold 110 and pressure within an intake manifold of a naturally aspirated engine under the same operating conditions.

The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other near the location of the turbine 160-1, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbine 160-1. The EGR valve 170 may be controlled by an EGR actuator module 172.

The engine system 100 may measure rotational speed of the crankshaft in revolutions per minute (RPM) using an RPM sensor 178. The engine system 100 may measure speed of the vehicle using a vehicle speed sensor 180. The vehicle speed may be determined based on, for example, a transmission output shaft speed (TOSS), one or more wheel speeds, or another suitable measure of the vehicle speed. Temperature of engine coolant may be measured using an engine coolant temperature (ECT) sensor 182. The ECT sensor 182 may be located within the engine 102 or at other locations where the coolant is circulated, such as a radiator (not shown).

Pressure within the intake manifold 110 may be measured using a manifold absolute pressure (MAP) sensor 184. In various implementations, engine vacuum may be measured, where engine vacuum includes a difference between ambient air pressure and the pressure within the intake manifold 110. Mass air flow rate into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100.

The ECM 114 may communicate with a transmission control module 194 to coordinate operation of the engine 102 with a transmission (not shown). For example, the ECM 114 may reduce engine output torque during a gear shift. The engine 102 may output torque to the transmission via a torque transmission device (not shown), such as a torque converter and/or one or more clutches. The transmission control module 194 may also share data with the ECM 114, such as a current gear ratio engaged within the transmission indicated by one or more gear sensors (not shown) and a state of the torque transmission device. For example only, for the case of the torque converter, the state may include a locked state or an unlocked state of a torque converter clutch (TCC) (not shown).

The ECM 114 may communicate with a hybrid control module 196 to coordinate operation of the engine 102 and an electric motor 198. The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

An engine actuator varies one or more engine parameters by controlling an associated actuator value. For example only, the throttle actuator module 116 may be referred to as an engine actuator and the throttle opening area may be referred to as the associated actuator value. In the example of FIG. 1, the throttle actuator module 116 achieves the throttle opening area by adjusting an angle of the blade of the throttle valve 112.

Similarly, the spark actuator module 126 may be referred to as an engine actuator, while the associated actuator value may refer to the amount of spark advance relative to cylinder TDC. Other engine actuators may include the cylinder actuator module 120, the fuel actuator module 124, the phaser actuator module 158, the boost actuator module 164, and the EGR actuator module 172. For these engine actuators, the associated actuator values may include number of activated cylinders, fueling rate, intake and exhaust cam phaser angles, boost pressure, and EGR valve opening area, respectively. The ECM 114 may control actuator values in order to cause the engine 102 to generate a desired engine output torque and achieve desired engine parameters.

Figure 2:
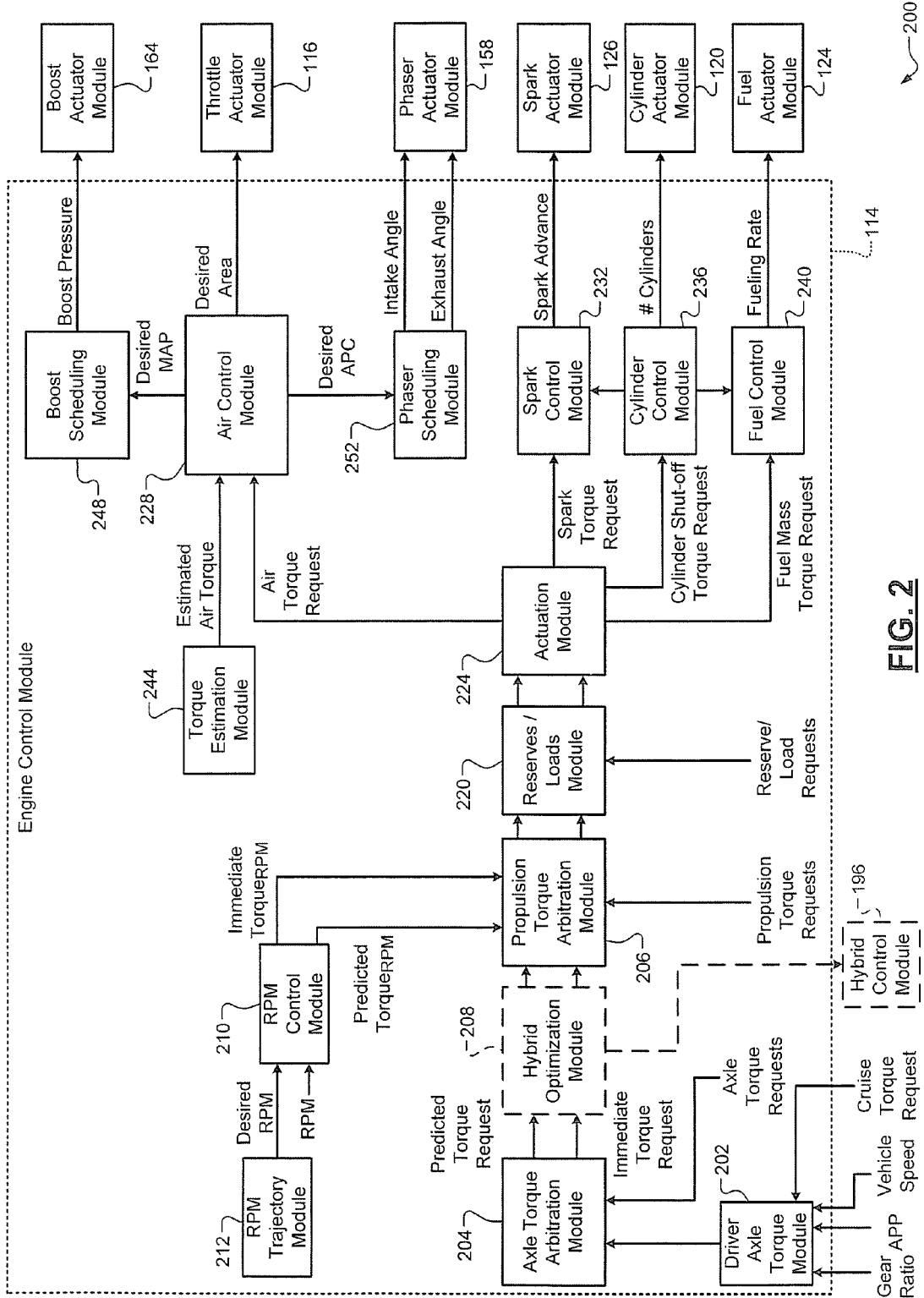
FIG. 2 is a functional block diagram of an exemplary implementation of an engine control system according to the principles of the present disclosure.

Referring now to FIG. 2, a functional block diagram of an exemplary engine control system 200 is presented. An exemplary implementation of the ECM 114 includes a driver axle torque module 202. The driver axle torque module 202 may determine a driver axle torque request according to the principles of the present disclosure as discussed further below. For example only, the driver axle torque module 202 may determine the driver axle torque request based on the APP, the cruise torque request, the vehicle speed, the gear ratio, and other suitable parameters.

An axle torque arbitration module 204 arbitrates between the driver axle torque request from the driver axle torque module 202 and other axle torque requests. Torque requests may include absolute torque requests as well as relative torque requests and ramp requests. For example only, ramp requests may include a request to ramp torque down to a minimum engine off torque or to ramp torque up from the minimum engine off torque. Relative torque requests may include temporary or persistent reductions or increases in the engine output torque.

The other axle torque requests may include a torque reduction requested by a traction control system when positive wheel slip is detected. Positive wheel slip occurs when axle torque (i.e., torque to the wheels) overcomes friction between the wheels and the road surface, and the wheels slip with respect to the road surface. The other axle torque requests may also include a torque increase request to counteract negative wheel slip, where a tire of the vehicle slips in the other direction with respect to the road surface because the axle torque is negative.

The other axle torque requests may also include brake management requests and vehicle over-speed torque requests. Brake management requests may request an engine torque reduction to ensure that the engine output torque does not exceed the ability of the brakes to hold the vehicle when the vehicle is stopped. Vehicle over-speed torque requests may request an engine torque reduction to prevent the vehicle from exceeding a predetermined speed. The other axle torque requests may also be generated by vehicle stability control systems.

The axle torque arbitration module 204 outputs a predicted torque request and an immediate torque request based on the results of arbitrating between the received torque requests. As described below, the predicted and immediate torque requests from the axle torque arbitration module 204 may selectively be adjusted by other modules of the ECM 114 before being used to control actuators of the engine 102.

In general terms, the immediate torque request is the amount of currently desired engine output torque, while the predicted torque request is the amount of engine output torque that may be needed on short notice. The ECM 114 therefore controls the engine 102 to achieve the immediate torque request. However, different combinations of actuator values may result in the same engine output torque. The ECM 114 may therefore adjust one or more of the actuator values to allow for a faster transition to the predicted torque request, while still maintaining the engine output torque at the immediate torque request.

In various implementations, the predicted torque request may be based on the driver axle torque request. The immediate torque request may be less than the predicted torque request, such as when the driver axle torque request is causing positive wheel slip on an icy surface (i.e., low coefficient of friction). In such a case, a traction control system (not shown) may request an engine torque reduction via the immediate torque request, and the ECM 114 reduces the engine output torque to the immediate torque request. However, the ECM 114 controls the actuator values so that the engine 102 is capable of quickly resuming the production of the predicted torque request once the wheel slip ends.

In general terms, the difference between the immediate torque request and the predicted torque request can be referred to as a torque reserve. The torque reserve represents the amount of additional torque that the engine 102 can begin to produce with minimal delay. Fast engine actuators are used to increase or decrease the engine output torque to achieve the immediate torque request. As described in more detail below, fast engine actuators are defined in contrast with slow engine actuators.

In various implementations, fast engine actuators are capable of varying the engine output torque within a range, where the range is established by the slow engine actuators. In such implementations, the upper limit of the range is the predicted torque request, while the lower limit of the range is limited by the torque capacity of the fast engine actuators. For example only, fast engine actuators may only be able to reduce the engine output torque by a first amount, where the first amount is a measure of the torque capacity of the fast actuators. The first amount may vary based on engine operating conditions set by the slow engine actuators. When the immediate torque request is within the range, fast engine actuators can be set to cause the engine output torque to be equal to the immediate torque request. When the ECM 114 requests that the engine output torque equal the predicted torque request, the fast engine actuators can be controlled to vary the engine output torque to the top of the range, which is the predicted torque request.

In general terms, the fast engine actuators can more quickly change the engine output torque as compared to the slow engine actuators. Slow engine actuators may respond more slowly to changes in their respective actuator values than fast engine actuators do. For example, a slow engine actuator may include mechanical components that require time to move from one position to another in response to a change in actuator value.

A slow engine actuator may also be characterized by the amount of time it takes for the engine output torque to respond once the slow engine actuator begins to implement the changed actuator value. Generally, this response time will be longer for slow engine actuators than for fast engine actuators. In addition, even after beginning to change, the engine output torque may take longer to fully respond to a change to an actuator value associated with a slow engine actuator.

For example only, the ECM 114 may set actuator values associated with the slow engine actuators to values that would enable the engine 102 to produce the predicted torque request if the fast engine actuators were set to appropriate values. Meanwhile, the ECM 114 may set actuator values associated with the fast engine actuators to values that, given the slow actuator values, cause the engine 102 to produce the immediate torque request instead of the predicted torque request.

The fast actuator values therefore cause the engine 102 to produce the immediate torque request. When the ECM 114 decides to transition the engine output torque from the immediate torque request to the predicted torque request, the ECM 114 changes the actuator values associated with one or more fast actuators to values that correspond to the predicted torque request. Because the slow actuator values have already been set based on the predicted torque request, the engine 102 is able to produce the predicted torque request after only the delay imposed by the fast engine actuators. In other words, the longer delay that would otherwise result from changing the engine output torque using slow engine actuators is avoided.

For example only, when the predicted torque request is equal to the driver torque request, a torque reserve may be created when the immediate torque request is less than the drive torque request due to a temporary torque reduction request. Alternatively, a torque reserve may be created by increasing the predicted torque request above the driver torque request while maintaining the immediate torque request at the driver torque request. The resulting torque reserve can absorb sudden increases in required engine output torque. For example only, sudden loads from an air conditioning compressor or a power steering pump may be counterbalanced by increasing the immediate torque request. If the increase in immediate torque request is less than the torque reserve, the increase can be quickly produced by using the fast engine actuators. The predicted torque request may then also be increased to re-establish the previous torque reserve.

Another exemplary use of a torque reserve is to reduce fluctuations in slow actuator values. Because of their relatively slow speed, varying slow actuator values may produce control instability. In addition, slow engine actuators may include mechanical parts, which may draw more power and/or wear more quickly when moved frequently. Creating a sufficient torque reserve allows changes in desired torque to be made by varying fast engine actuators via the immediate torque request while maintaining the actuator values of the slow engine actuators. For example, to maintain a given idle speed, the immediate torque request may vary within a range. If the predicted torque request is set to a level above this range, variations in the immediate torque request that maintain the idle speed can be made using fast engine actuators without the need to adjust slow engine actuators.

For example only, in a spark-ignition engine, spark timing may be a fast engine actuator, while throttle opening area may be a slow engine actuator. Spark-ignition engines may combust fuels including, for example, gasoline and ethanol, by applying a spark. By contrast, a compression-ignition engine may combust fuels including, for example, diesel, by compressing the fuels.

After receiving a new actuator value, the spark actuator module 126 may be able to change the spark timing for a firing event of a next cylinder in a firing order. When the spark timing for a firing event is set to a calibrated value, maximum torque is produced during the combustion stroke immediately following that firing event. However, a spark timing deviating from the calibrated value may reduce the amount of torque produced in the combustion stroke. Therefore, the spark actuator module 126 may be able to vary engine output torque as soon as the next firing event occurs by varying the spark timing. For example only, a table of spark timings corresponding to different engine operating conditions may be determined during a calibration phase of vehicle design, and the calibrated value is selected from the table based on current engine operating conditions.

By contrast, changes in throttle opening area take longer to affect the engine output torque. The throttle actuator module 116 changes the throttle opening area by adjusting the angle of the blade of the throttle valve 112. Therefore, once a new actuator value is received, there is a mechanical delay as the throttle valve 112 moves from its previous position to a new position corresponding to the new actuator value.

In addition, air flow changes based on the throttle opening are subject to air transport delays in the intake manifold 110. Further, increased air flow in the intake manifold 110 is not realized as an increase in engine output torque until the cylinder 118 receives additional air in the next intake stroke, compresses the additional air, and commences the combustion stroke.

Using these actuators as an example, a torque reserve can be created by setting the throttle opening area to a value that would allow the engine 102 to produce a predicted torque request. Meanwhile, the spark timing can be set based on an immediate torque request that is less than the predicted torque request. Although the throttle opening area generates enough air flow for the engine 102 to produce the predicted torque request, the spark timing is retarded (which reduces the engine output torque) based on the immediate torque request. The engine output torque will therefore be equal to the immediate torque request.

When additional torque is needed, such as when the air conditioning compressor is started, the spark timing can be set based on the predicted torque request. By the next firing event, the spark actuator module 126 may return the spark advance to a calibrated value, which allows the engine 102 to produce engine torque output equal to the predicted torque request as the air flow is already present. The engine output torque may therefore be quickly increased to the predicted torque request without experiencing delays from changing the throttle opening area.

The axle torque arbitration module 204 may output the predicted torque request and the immediate torque request to a propulsion torque arbitration module 206. In various implementations, the axle torque arbitration module 204 may output the predicted and immediate torque requests to a hybrid optimization module 208. The hybrid optimization module 208 determines how much torque should be produced by the engine 102 and how much torque should be produced by the electric motor 198. The hybrid optimization module 208 then outputs modified predicted and immediate torque requests to the propulsion torque arbitration module 206. In various implementations, the hybrid optimization module 208 may be implemented in the hybrid control module 196.

The predicted and immediate torque requests received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between the converted predicted and immediate torque requests and other propulsion torque requests. The propulsion torque arbitration module 206 generates an arbitrated predicted torque request and an arbitrated immediate torque request. The arbitrated torques may be generated by selecting a winning request from among received requests. Alternatively or additionally, the arbitrated torques may be generated by modifying one of the received requests based on another one or more of the received requests.

The other propulsion torque requests may include engine torque reductions requested for engine over-speed protection, engine torque increases requested for stall prevention, and engine torque reductions requested by the transmission control module 194 to accommodate gear shifts. The other propulsion torque requests may also result from clutch fuel cut-off, which reduces the engine output torque when the driver depresses the clutch pedal in a manual transmission vehicle to prevent a flare (rapid rise) in engine speed.

The other propulsion torque requests may also include an engine shutoff request, which may be initiated when a critical fault is detected. For example only, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 206 may output zero as the arbitrated torques.

In various implementations, an engine shutoff request may simply shut down the engine 102 separately from the arbitration process. The propulsion torque arbitration module 206 may still receive the engine shutoff request so that, for example, appropriate data can be fed back to other torque requestors. For example, all other torque requestors may be informed that they have lost arbitration.

An RPM control module 210 may also output predicted and immediate torque requests to the propulsion torque arbitration module 206. The torque requests from the RPM control module 210 may prevail in arbitration when the ECM 114 is in an RPM mode. The RPM mode may be selected when the driver removes pressure from the accelerator pedal, such as when the vehicle is idling or coasting. Alternatively or additionally, the RPM mode may be selected when the predicted torque request from the axle torque arbitration module 204 is less than a calibratable torque value, such as when the engine 102 is idling.

The RPM control module 210 receives a desired RPM from an RPM trajectory module 212, and controls the predicted and immediate torque requests to reduce the difference between the desired RPM and the actual RPM. For example only, the RPM trajectory module 212 may output a linearly decreasing desired RPM for vehicle coastdown until an idle RPM is reached. The RPM trajectory module 212 may then continue outputting the idle RPM as the desired RPM.

A reserves/loads module 220 receives the arbitrated predicted and immediate torque requests from the propulsion torque arbitration module 206. The reserves/loads module 220 may adjust the arbitrated predicted and immediate torque requests to create a torque reserve and/or to compensate for one or more loads. The reserves/loads module 220 then outputs the adjusted predicted and immediate torque requests to an actuation module 224.

For example only, a catalyst light-off process or a cold start emissions reduction process may require retarded spark advance. The reserves/loads module 220 may therefore increase the adjusted predicted torque request above the adjusted immediate torque request to create retarded spark for the cold start emissions reduction process. In another example, the air/fuel ratio of the engine 102 and/or the mass air flow may be directly varied, such as by diagnostic intrusive equivalence ratio testing and/or new engine purging. Before beginning these processes, a torque reserve may be created or increased to quickly offset decreases in engine output torque that result from leaning the air/fuel mixture during these processes.

The reserves/loads module 220 may also create or increase a torque reserve in anticipation of a future load, such as power steering pump operation or engagement of an air conditioning (A/C) compressor clutch. The reserve for engagement of the A/C compressor clutch may be created when the driver first requests air conditioning. The reserves/loads module 220 may increase the adjusted predicted torque request while leaving the adjusted immediate torque request unchanged to produce the torque reserve. Then, when the A/C compressor clutch engages, the reserves/loads module 220 may increase the immediate torque request by the estimated load of the A/C compressor clutch.

The actuation module 224 receives the adjusted predicted and immediate torque requests from the reserves/loads module 220. The actuation module 224 determines how the adjusted predicted and immediate torque requests will be achieved. The actuation module 224 may be engine type specific. For example only, the actuation module 224 may be implemented differently or use different control schemes for spark-ignition engines versus compression-ignition engines.

In various implementations, the actuation module 224 may define a boundary between modules that are common across all engine types and modules that are engine type specific. For example only, engine types may include spark-ignition and compression-ignition. Modules prior to the actuation module 224, such as the propulsion torque arbitration module 206, may be common across engine types, while the actuation module 224 and subsequent modules may be engine type specific.

For example only, in a spark-ignition engine, the actuation module 224 may vary the opening of the throttle valve 112 as a slow actuator that allows for a wide range of torque control. The actuation module 224 may disable cylinders using the cylinder actuator module 120, which also provides for a wide range of torque control, but may also be slow and may involve drivability and emissions concerns. The actuation module 224 may use spark timing as a fast actuator. However, spark timing may not provide as much range of torque control. In addition, the amount of torque control possible with changes in spark timing (referred to as spark reserve capacity) may vary as air flow changes.

In various implementations, the actuation module 224 may generate an air torque request based on the adjusted predicted torque request. The air torque request may be equal to the adjusted predicted torque request, setting air flow so that the adjusted predicted torque request can be achieved by changes to other engine actuators.

An air control module 228 may determine desired actuator values based on the air torque request. For example, the air control module 228 may control desired manifold absolute pressure (MAP), desired throttle area, and/or desired air per cylinder (APC). Desired MAP may be used to determine desired boost, and desired APC may be used to determine desired cam phaser positions. In various implementations, the air control module 228 may also determine an amount of opening of the EGR valve 170.

The actuation module 224 may also generate a spark torque request, a cylinder shut-off torque request, and a fuel mass torque request. The spark torque request may be used by a spark control module 232 to determine how much to retard the spark timing (which reduces engine output torque) from a calibrated spark advance.

The cylinder shut-off torque request may be used by a cylinder control module 236 to determine how many cylinders to deactivate. The cylinder control module 236 may instruct the cylinder actuator module 120 to deactivate one or more cylinders of the engine 102. In various implementations, a predefined group of one or more cylinders may be deactivated jointly.

The cylinder control module 236 may also instruct a fuel control module 240 to stop providing fuel for deactivated cylinders and may instruct the spark control module 232 to stop providing spark for deactivated cylinders. In various implementations, the spark control module 232 only stops providing spark for a cylinder once any fuel/air mixture already present in the cylinder has been combusted.

In various implementations, the cylinder actuator module 120 may include a hydraulic system that selectively decouples intake and/or exhaust valves from the corresponding camshafts for one or more cylinders in order to deactivate those cylinders. For example only, valves for half of the cylinders are either hydraulically coupled or decoupled as a group by the cylinder actuator module 120. In various implementations, cylinders may be deactivated simply by halting provision of fuel to those cylinders, without stopping the opening and closing of the intake and exhaust valves. In such implementations, the cylinder actuator module 120 may be omitted.

The fuel control module 240 may vary the amount of fuel provided to each cylinder based on the fuel mass torque request from the actuation module 224. During normal operation of a spark-ignition engine, the fuel control module 240 may attempt to maintain a stoichiometric air/fuel ratio. The fuel control module 240 may therefore determine a fuel mass that will yield stoichiometric combustion when combined with the current mass of air per cylinder. The fuel control module 240 may instruct the fuel actuator module 124 to inject this fuel mass for each activated cylinder.

Based on the fuel mass torque request, the fuel control module 240 may adjust the air/fuel ratio with respect to stoichiometry to increase or decrease the engine output torque. The fuel control module 240 may then determine a fuel mass for each cylinder that achieves the desired air/fuel ratio. In diesel systems, fuel mass may be the primary actuator for controlling the engine output torque.

A mode setting may determine how the actuation module 224 treats the adjusted immediate torque request. The mode setting may be provided to the actuation module 224, such as by the propulsion torque arbitration module 206, and may select modes including an inactive mode, a pleasible mode, a maximum range mode, and an auto actuation mode.

In the inactive mode, the actuation module 224 may ignore the adjusted immediate torque request and set engine output torque based on the adjusted predicted torque request. The actuation module 224 may therefore set the spark torque request, the cylinder shut-off torque request, and the fuel mass torque request to the adjusted predicted torque request, which maximizes the engine output torque for the current engine air flow conditions. Alternatively, the actuation module 224 may set these requests to predetermined (such as out-of-range high) values to disable torque reductions from retarding spark, deactivating cylinders, or reducing the fuel/air ratio.

In the pleasible mode, the actuation module 224 outputs the adjusted predicted torque request as the air torque request and attempts to achieve the adjusted immediate torque request by adjusting only spark advance. The actuation module 224 therefore outputs the adjusted immediate torque request as the spark torque request. The spark control module 232 will retard the spark as much as possible to attempt to achieve the spark torque request. If the desired torque reduction is greater than the spark reserve capacity (the amount of torque reduction achievable by spark retard), the torque reduction may not be achieved. The engine output torque will then be greater than the adjusted immediate torque request.

In the maximum range mode, the actuation module 224 may output the adjusted predicted torque request as the air torque request and the adjusted immediate torque request as the spark torque request. In addition, the actuation module 224 may decrease the cylinder shut-off torque request (thereby deactivating cylinders) when reducing spark advance alone is unable to achieve the adjusted immediate torque request.

In the auto actuation mode, the actuation module 224 may decrease the air torque request based on the adjusted immediate torque request. In various implementations, the air torque request may be reduced only so far as is necessary to allow the spark control module 232 to achieve the adjusted immediate torque request by adjusting spark advance. Therefore, in auto actuation mode, the adjusted immediate torque request is achieved while adjusting the air torque request as little as possible. In other words, the use of relatively slowly-responding throttle valve opening is minimized by reducing the quickly-responding spark advance as much as possible. This allows the engine 102 to return to producing the adjusted predicted torque request as quickly as possible.

A torque estimation module 244 may estimate torque output of the engine 102. This estimated torque may be used by the air control module 228 to perform closed-loop control of engine air flow parameters, such as throttle area, MAP, and phaser positions. For example only, a torque relationship such as $$T = f(APC, S, I, E, AF, OT, \#) \quad (1)$$

may be defined, where torque (T) is a function of air per cylinder (APC), spark advance (S), intake cam phaser position (I), exhaust cam phaser position (E), air/fuel ratio (AF), oil temperature (OT), and number of activated cylinders (#). Additional variables may also be accounted for, such as the degree of opening of an exhaust gas recirculation (EGR) valve. This relationship may be modeled by an equation and/or may be stored as a lookup table.

The torque estimation module 244 may determine APC based on measured MAF and current RPM, thereby allowing closed loop air control based on actual air flow. The intake and exhaust cam phaser positions used may be based on actual positions, as the phasers may be traveling toward desired positions.

The actual spark advance may be used to estimate the engine output torque. When a calibrated spark advance value is used to estimate the engine output torque, the estimated torque may be called an estimated air torque, or simply air torque. The air torque may be an estimate of how much torque the engine 102 could generate at the current air flow if spark retard was removed (i.e., spark timing was set to the calibrated spark advance value) and all cylinders were fueled.

The air control module 228 may output a desired area signal to the throttle actuator module 116. The throttle actuator module 116 then regulates the throttle valve 112 to produce the desired throttle area. The air control module 228 may generate the desired area signal based on an inverse torque model and the air torque request. The air control module 228 may use the estimated air torque and/or the MAF signal in order to perform closed loop control. For example, the desired area signal may be controlled to minimize a difference between the estimated air torque and the air torque request.

The air control module 228 may output a desired manifold absolute pressure (MAP) signal to a boost scheduling module 248. The boost scheduling module 248 uses the desired MAP signal to control the boost actuator module 164. The boost actuator module 164 then controls one or more turbochargers (e.g., the turbocharger including the turbine 160-1 and the compressor 160-2) and/or superchargers.

The air control module 228 may also output a desired air per cylinder (APC) signal to a phaser scheduling module 252. Based on the desired APC signal and the RPM signal, the phaser scheduling module 252 may control positions of the intake and/or exhaust cam phasers 148 and 150 using the phaser actuator module 158.

Referring back to the spark control module 232, calibrated spark advance values may vary based on various engine operating conditions. For example only, a torque relationship may be inverted to solve for desired spark advance. For a given torque request ($T_{des}$), the desired spark advance ($S_{des}$) may be determined based on $$S_{des} = T^{-1}(T_{des}, APC, I, E, AF, OT, \#) \quad (2)$$

This relationship may be embodied as an equation and/or as a lookup table. The air/fuel ratio (AF) may be the actual air/fuel ratio, as reported by the fuel control module 240.

When the spark advance is set to the calibrated spark advance, the resulting torque may be as close to mean best torque (MBT) as possible. MBT refers to the maximum engine output torque that is generated for a given air flow as spark advance is increased, while using fuel having an octane rating greater than a predetermined threshold and using stoichiometric fueling. The spark advance at which this maximum torque occurs is referred to as MBT spark. The calibrated spark advance may differ slightly from MBT spark because of, for example, fuel quality (such as when lower octane fuel is used) and environmental factors. The torque at the calibrated spark advance may therefore be less than MBT.

Figure 3:
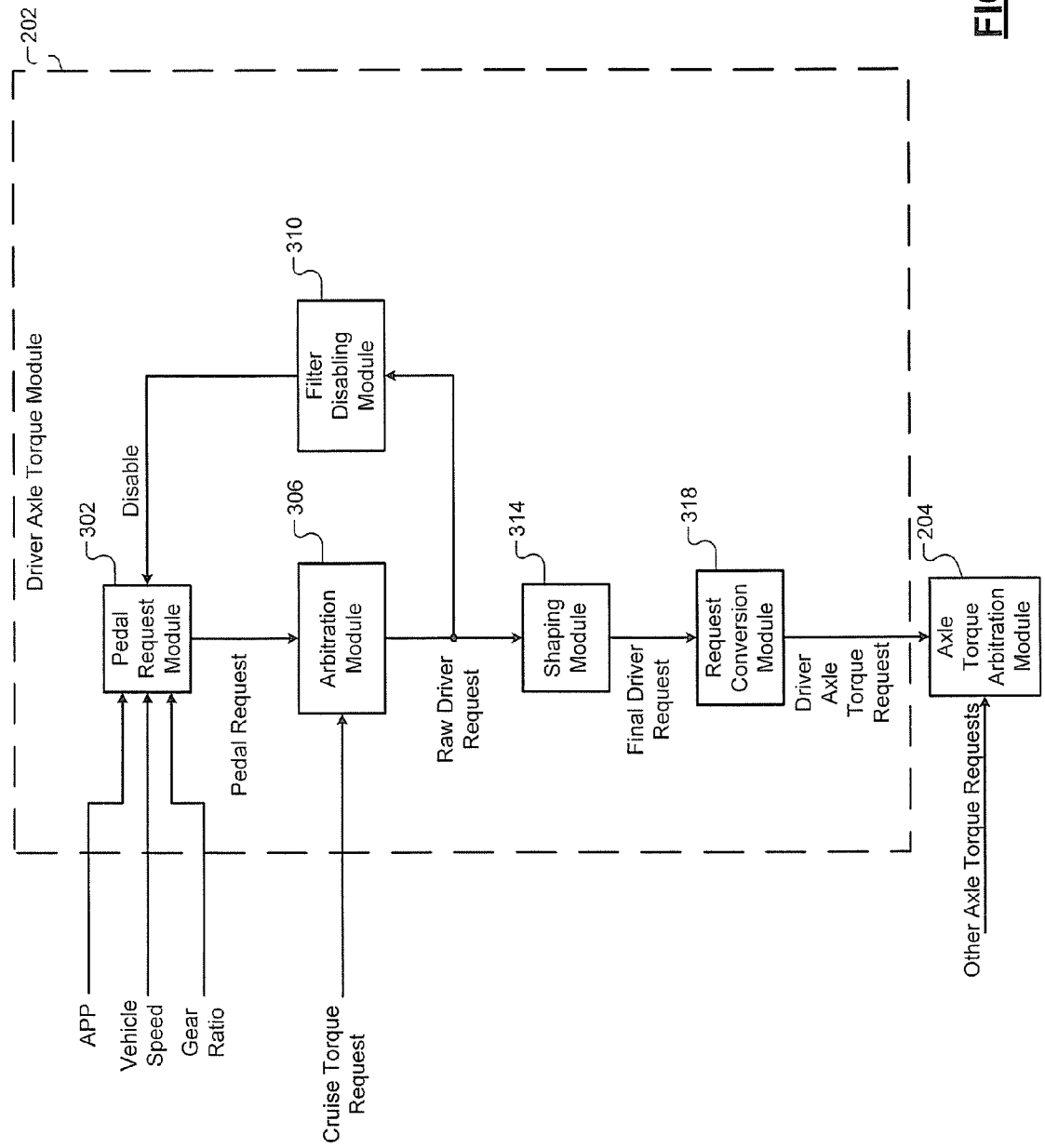
FIG. 3 is a functional block diagram of an exemplary implementation of a driver axle torque module according to the principles of the present disclosure.

Referring now to FIG. 3, a functional block diagram of an exemplary implementation of the driver axle torque module 202 is presented. The driver axle torque module 202 may include a pedal request module 302, an arbitration module 306, and a filter disabling module 310. The driver axle torque module 202 may also include a shaping module 314 and a request conversion module 318.

The pedal request module 302 determines a pedal torque request and a filtered pedal torque request. The determination of the pedal torque request and the filtered pedal torque request is discussed further below with respect to the exemplary embodiment of FIG. 4. The pedal request module 302 may select one of the pedal torque request and the filtered pedal torque request based on a state of a disable signal set by the filter disabling module 310 as discussed further below. The pedal request module 302 selectively outputs the selected one of the pedal torque request and the filtered pedal torque request as a pedal request. The pedal request may be in terms of the propulsion torque domain (i.e., torque at the crankshaft).

The arbitration module 306 receives the pedal request and other driver torque requests and arbitrates between the received requests. For example only, the arbitration module 306 may arbitrate between the pedal request and the cruise torque request. The arbitration module 306 outputs the winner of the arbitration as a raw driver request. The raw driver request may be in terms of the propulsion torque domain (i.e., torque at the crankshaft).

The filter disabling module 310 monitors the raw driver request and selectively sets the state of the disable signal based on a comparison of the raw driver request and a predetermined torque. For example only, the filter disabling module 310 may set the disable signal to an active state (e.g., digital 5 V) when the raw driver request is less than the predetermined torque and may set the disable signal to an inactive state (e.g., digital 0 V) when the raw driver request is greater than or equal to the predetermined torque.

The predetermined torque may be calibratable and may be set based on a sum of a predetermined hysterisis torque and an upper limit of a lash zone. The upper limit of the lash zone may correspond to engine output torque below which a "bump" may be experienced within a passenger cabin of the vehicle when a driver tips-in to or tips-out of the accelerator pedal. For example only, the calibratable hysterisis torque may be approximately 5 Nm and the upper limit of the lash zone may be approximately 15 Nm.

The shaping module 314 receives the raw driver request and selectively shapes the raw driver request to reduce or prevent bumps attributable to tip-ins and tip-outs of the accelerator pedal. For example only, the shaping module 314 may apply one or more filters to the raw driver request. The shaping module 314 outputs the selectively shaped raw driver request as a final driver request. The final driver request may be in terms of the propulsion torque domain (i.e., torque at the crankshaft).

The request conversion module 318 converts the final driver request from the propulsion torque domain into the axle torque domain (torque at the wheels). The request conversion module 318 outputs the final driver torque request after the conversion into the axle torque domain as the driver axle torque request. The request conversion module 318 provides the driver axle torque request to the axle torque arbitration module 204 for arbitration with the other axle torque requests as discussed above.

Figure 4:
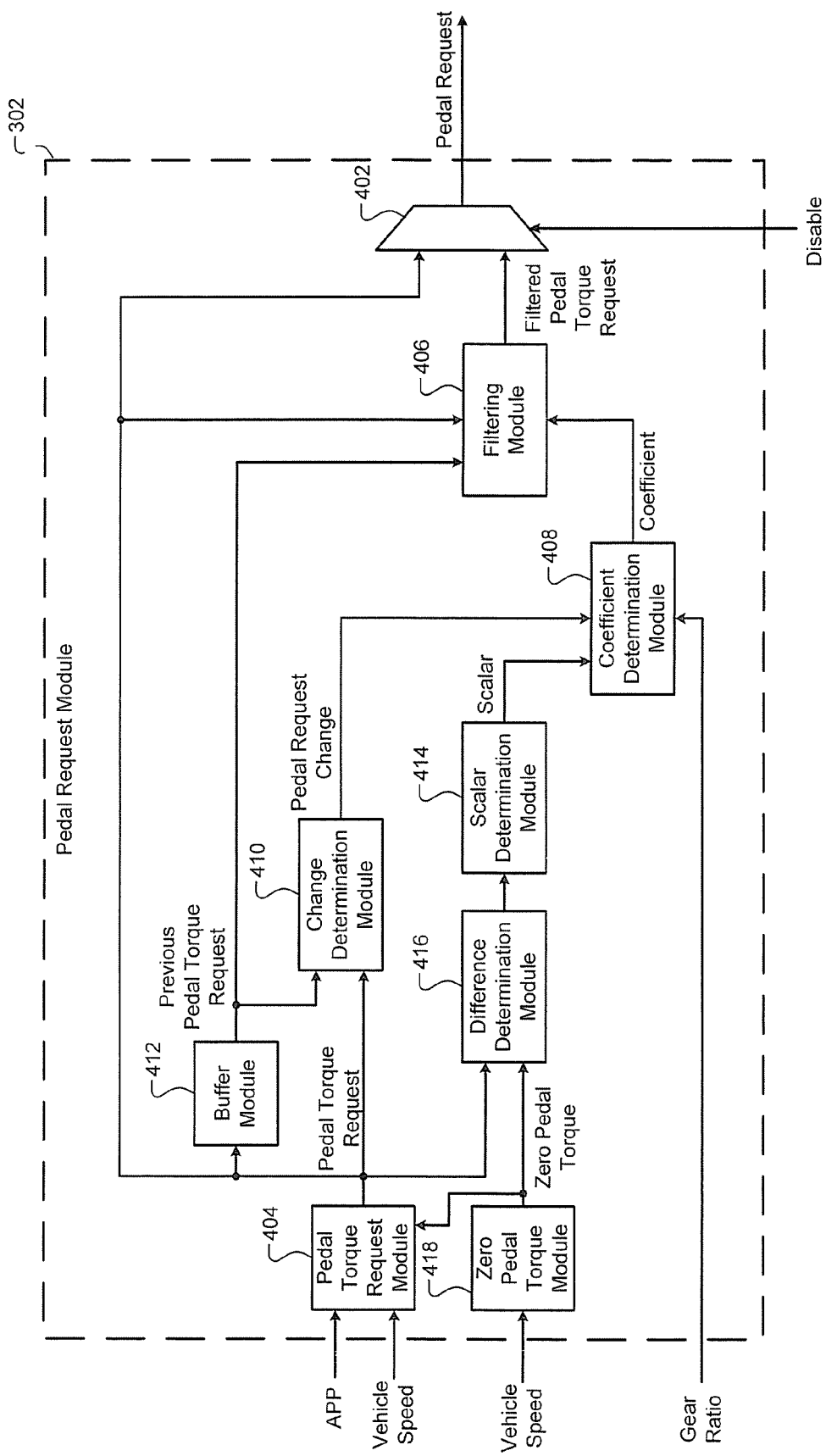
FIG. 4 is a functional block diagram of an exemplary pedal request module according to the principles of the present disclosure.

Referring now to FIG. 4, a functional block diagram of an exemplary implementation of the pedal request module 302 is presented. The pedal request module 302 may include a selection module 402, a pedal torque request module 404, and a filtering module 406. The pedal request module 302 may also include a coefficient determination module 408, a change determination module 410, a buffer module 412, a scalar determination module 414, a difference determination module 416, and a zero pedal torque module 418.

The selection module 402 selects one of the pedal torque request and the filtered pedal torque request based on the status of the disable signal. For example only, the selection module 402 may select the pedal torque request when the disable signal is in the active state and may select the filtered pedal torque request when the disable signal is in the inactive state. In this manner, filtering of the pedal torque request applied in determining the filtered pedal torque request may be said to be disabled when the raw driver request is less than the predetermined torque. The selection module 402 outputs the selected one of the pedal torque request and the filtered pedal torque request as the pedal request. The selection module 402 may include a multiplexer as shown in the exemplary embodiment of FIG. 4 and/or another suitable selection device.

The pedal torque request module 404 determines the pedal torque request and provides the pedal torque request to the selection module 402. The pedal torque request module 404 may determine the pedal torque request based on the APP and the vehicle speed. For example only, the pedal torque request module 404 may determine the pedal torque request from a mapping (e.g., a lookup table) of pedal torque requests indexed by APP and vehicle speed.

The filtering module 406 determines the filtered pedal torque request and provides the filtered pedal torque request to the selection module 402. The filtering module 406 may determine the filtered pedal torque request based on the pedal torque request. The filtering module 406 may determine the filtered pedal torque request further based on a previous pedal torque request and a filter coefficient. For example only, the filtering module 406 may determine the filtered pedal torque request using the equation:

$$FPTR = 1 + Coef*PTR - Coef*PPTR \quad (3)$$

where FPTR is the filtered pedal torque request, Coef is the filter coefficient, PTR is the pedal torque request, and PPTR is the previous pedal torque request.

The coefficient determination module 408 determines the filter coefficient based on the gear ratio engaged within the transmission, a scalar value, and a pedal request change, and a direction (e.g., positive or negative) of the pedal request change. For example only, the coefficient determination module 408 may determine the filter coefficient from a mapping (e.g., a lookup table) of filter coefficients indexed by gear ratio, scalar value, pedal request change, and direction. The coefficient determination module 408 may determine the filter coefficient further based on whether the TCC is in an unlocked state or a locked state. For example only, the coefficient determination module 408 determine the filter coefficient from one mapping when the TCC is in the unlocked state and determine the filter coefficient from another mapping when the TOO is in the locked state.

The coefficient determination module 408 may also selectively maintain the filter coefficient (i.e., leave the filter coefficient unchanged). For example only, the coefficient determination module 408 may maintain the filter coefficient when a gear shift is occurring within the transmission. A gear shift may be deemed occurring when the gear ratio is changing, when the torque converter is in the unlocked state, when a gear shift signal is received from the transmission control module 194, or when one or more other suitable events indicative of a gear shift occur. The coefficient determination module 408 may maintain the filter coefficient for a predetermined period, until the gear shift has completed, or for another suitable period.

The change determination module 410 determines the pedal request change based on a difference between the pedal torque request and the previous pedal torque request. For example only, the change determination module 410 may determine the pedal request change based on the pedal torque request less the previous pedal torque request. The change determination module 410 may also provide the direction of the pedal request change to the coefficient determination module 408. For example only, the change determination module 410 may indicate that the direction is negative when the pedal request change is less than zero and that the direction is positive when the pedal request change is greater than or equal to zero.

The buffer module 412 may provide the previous pedal torque request. For example only, the buffer module 412 may receive the pedal torque request from the pedal torque request module 404 and delay output of the pedal torque request for a predetermined period, such as one control loop. In this manner, the pedal torque request output by the buffer module 412 may include the pedal torque request determined during a last executed control loop (i.e., the previous pedal torque request).

The scalar determination module 414 determines the scalar value based on a difference between the pedal torque request and a zero pedal torque. The difference determination module 416 determines the difference between the pedal torque request and the zero pedal torque and provides the difference to the scalar determination module 414. This difference may be referred to as a true driver torque request as the difference reflects the amount of engine torque output currently being requested by the driver via the accelerator pedal under the current operating conditions. For example only, the scalar value may include a value between 0 and 1, and the scalar value may approach 1 as the difference increases.

The zero pedal torque module 418 determines the zero pedal torque. For example only, the zero pedal torque module 418 may determine the zero pedal torque based on the vehicle speed. The zero pedal torque may correspond to a torque from which the pedal torque request may begin increasing when the driver tips-in to the accelerator pedal from a predetermined resting (i.e., zero) APP. For example only, the pedal torque request may be updated to the zero pedal torque when the APP is equal to the predetermined resting APP for a predetermined period.

Figure 5:
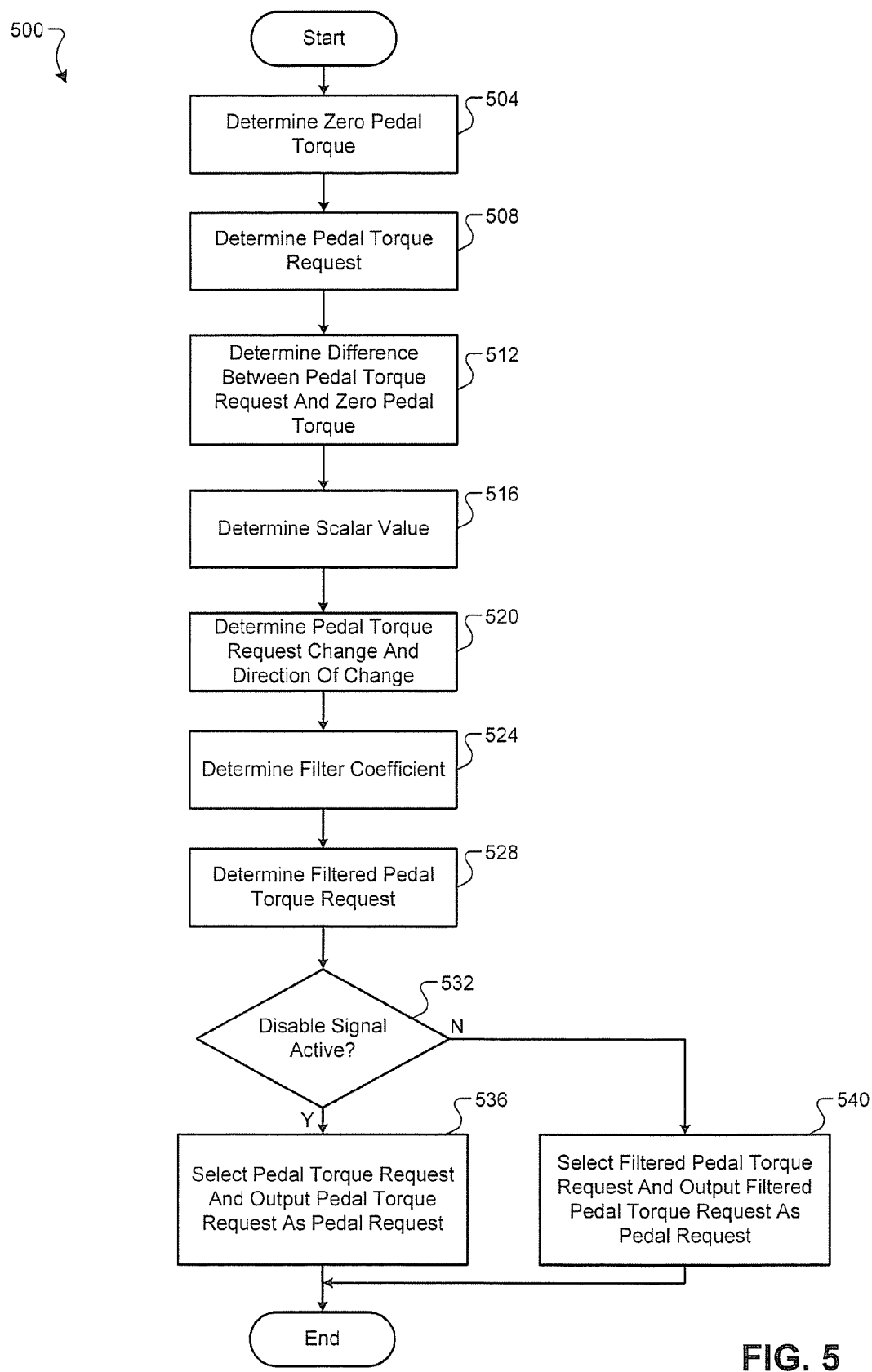
FIG. 5 is flowchart depicting exemplary steps performed by a method according to the principles of the present disclosure.

Referring now to FIG. 5, a flowchart depicting exemplary steps 500 performed by a method is presented. Control may begin in step 504 where control determines the zero pedal torque. For example only, control may determine the zero pedal torque based on the vehicle speed. Control determines the pedal torque request in step 508. For example only, control may determine the pedal torque request based on the APP and the vehicle speed.

In step 512, control determines a difference between the pedal torque request and the zero pedal torque. This difference may be referred to as the true driver torque request as the difference reflects the amount of engine torque output actually requested by the driver via the accelerator pedal under the current operating conditions.

Control determines the scalar value in step 516 based on the difference between the pedal torque request and the zero pedal torque. Control determines the pedal torque request change and the direction of the change in step 520. Control determines the pedal torque request change and the direction of the change based on a difference between the pedal torque request and the previous pedal torque request. For example only, the previous pedal torque request may include the pedal torque request during a last control loop. The direction of the change may include the positive direction or the negative direction.

Control determines the filter coefficient in step 524. For example only, control may determine the filter coefficient based on the scalar value, the pedal torque request change, the direction of the change, and the gear ratio. Control may also determine the filter coefficient based on whether the TCC is in the locked state or the unlocked state and/or whether a gear shift is occurring within the transmission.

In step 528, control determines the filtered pedal torque request. Control may determine the filtered pedal torque request based on the pedal torque request, the previous pedal torque request, and the filter coefficient. For example only, control may determine the filtered pedal torque request using (3) as described above.

Control determines whether the disable signal is in the active state in step 532. If true, control may proceed to step 536; if false, control may transfer to step 540. In step 536, control selects the pedal torque request and outputs the pedal torque request as the pedal request. In step 540, control selects the filtered pedal torque request and outputs the filtered pedal torque request as the pedal request. The pedal request is provided to the arbitration module 306 for arbitration with the cruise control inputs. Control may end after step 536 or step 540 is performed.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system comprising:
   a pedal torque request module that determines a first pedal torque request at a first time and that determines a second pedal torque request at a second time, wherein the first time is before the second time;
   a filtering module that determines a filtered pedal torque request based on the first pedal torque request, the second pedal torque request, and a filter coefficient;
   a selection module that selects one of the second pedal torque request and the filtered pedal torque request; and
   an arbitration module that arbitrates between at least one driver torque request and the selected one of the second pedal torque request and the filtered pedal torque request, that outputs a raw driver request based on a result of the arbitration, and that controls at least one engine actuator based on the raw driver request.

2. The engine control system of claim 1 wherein the arbitration module arbitrates between a cruise torque request provided by a cruise control system and the selected one of the second pedal torque request and the filtered pedal torque request.

3. The engine control system of claim 1 further comprising a filter disabling module that selectively sets a state of a disable signal to one of a first state and a second state based on a comparison of the raw driver request and a predetermined torque,
   wherein the selection module selects the one of the second pedal torque request and the filtered pedal torque request based on the state of the disable signal.

4. The engine control system of claim 1 further comprising a coefficient determination module that determines the filter coefficient based on a difference between the first pedal torque request and the second pedal torque request, a direction of the difference, a scalar value, and a gear ratio.

5. The engine control system of claim 4 further comprising:
   a zero pedal torque module that determines a zero pedal torque based on a vehicle speed; and
   a scalar determination module that determines the scalar value at the second time based on a difference between the zero pedal torque and the second pedal torque request.

6. The engine control system of claim 1 wherein the filtering module determines the filtered pedal torque request based on a first product of the filter coefficient and the first pedal torque request and further based on a second product of the filter coefficient and the second pedal torque request.

7. The engine control system of claim 6 wherein the filtering module determines the filtered pedal torque request based on a difference between the first product and a sum of the second product and a predetermined value.

8. The engine control system of claim 1 wherein the pedal torque request module determines the first pedal torque request based on a first accelerator pedal position and a first vehicle speed measured at the first time and determines the second pedal torque request based on a second accelerator pedal position and a second vehicle speed measured at the second time.

9. The engine control system of claim 1 further comprising:
a shaping module that selectively shapes the raw driver request into a final driver request;
a request conversion module that converts the final driver request into an axle torque request; and
an axle torque arbitration module that arbitrates between the axle torque request and at least one other axle torque request.

10. The engine control system of claim 9 further comprising:
a propulsion torque arbitration module that arbitrates between at least one propulsion torque request and a second result of the arbitration between the axle torque request and the at least one other axle torque request; and
an actuation module that controls the at least one engine actuator based on the second result of the arbitration between the at least one propulsion torque request and the second result of the arbitration between the axle torque request and the at least one other axle torque request.

11. An engine control method comprising:
determining a first pedal torque request at a first time;
determining a second pedal torque request at a second time, wherein the first time is before the second time;
determining a filtered pedal torque request based on the first pedal torque request, the second pedal torque request, and a filter coefficient;
selecting one of the second pedal torque request and the filtered pedal torque request;
arbitrating between at least one driver torque request and the selected one of the second pedal torque request and the filtered pedal torque request;
outputting a raw driver request based on a result of the arbitration; and
controlling at least one engine actuator based on the raw driver request.

12. The engine control method of claim 11 further comprising arbitrating between a cruise torque request provided by a cruise control system and the selected one of the second pedal torque request and the filtered pedal torque request.

13. The engine control method of claim 11 further comprising:
selectively setting a state of a disable signal to one of a first state and a second state based on a comparison of the raw driver request and a predetermined torque; and
selecting the one of the second pedal torque request and the filtered pedal torque request based on the state of the disable signal.

14. The engine control method of claim 11 further comprising determining the filter coefficient based on a difference between the first pedal torque request and the second pedal torque request, a direction of the difference, a scalar value, and a gear ratio.

15. The engine control method of claim 14 further comprising:
determining a zero pedal torque based on a vehicle speed; and
determining the scalar value at the second time based on a difference between the zero pedal torque and the second pedal torque request.

16. The engine control method of claim 11 further comprising determining the filtered pedal torque request based on a first product of the filter coefficient and the first pedal torque request and further based on a second product of the filter coefficient and the second pedal torque request.

17. The engine control method of claim 16 further comprising determining the filtered pedal torque request based on a difference between the first product and a sum of the second product and a predetermined value.

18. The engine control method of claim 11 further comprising:
determining the first pedal torque request based on a first accelerator pedal position and a first vehicle speed measured at the first time; and
determining the second pedal torque request based on a second accelerator pedal position and a second vehicle speed measured at the second time.

19. The engine control method of claim 11 further comprising:
selectively shaping the raw driver request into a final driver request;
converting the final driver request into an axle torque request; and
arbitrating between the axle torque request and at least one other axle torque request.

20. The engine control method of claim 19 further comprising:
arbitrating between at least one propulsion torque request and a second result of the arbitration between the axle torque request and the at least one other axle torque request; and
controlling the at least one engine actuator based on the second result of the arbitration between the at least one propulsion torque request and the second result of the arbitration between the axle torque request and the at least one other axle torque request.

* * * * *